R. CASSIDY, T. B. LAMB & C. L. VAUGHAN.
PLOW.

No. 177,469. Patented May 16, 1876.

UNITED STATES PATENT OFFICE.

ROBERT CASSIDY, THOMAS B. LAMB, AND CHAUNCEY L. VAUGHAN, OF BELOIT, KANSAS.

IMPROVEMENT IN PLOWS.

Specification forming part of Letters Patent No. 177,469, dated May 16, 1876; application filed February 28, 1876.

*To all whom it may concern:*

Figure 1:
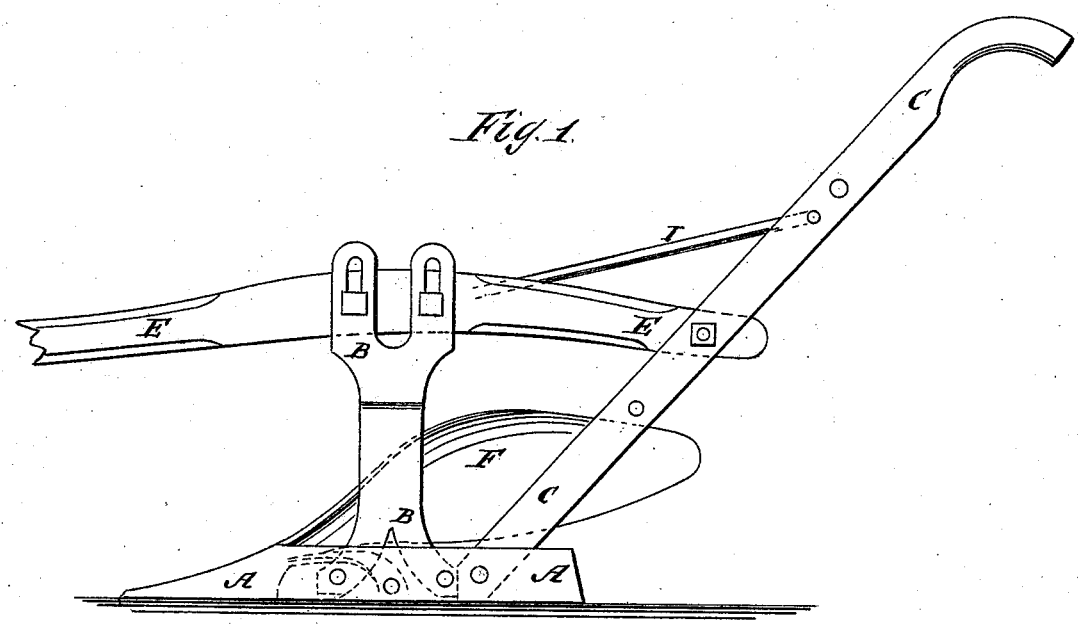
Figure 2:
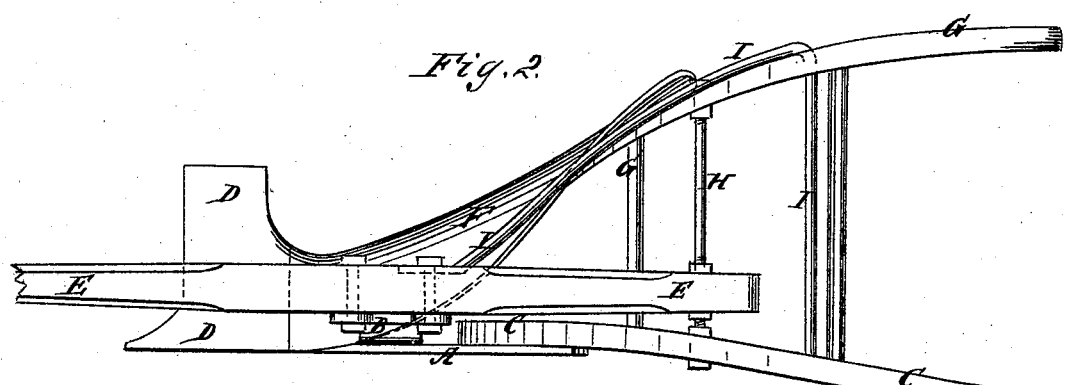
Figure 3:
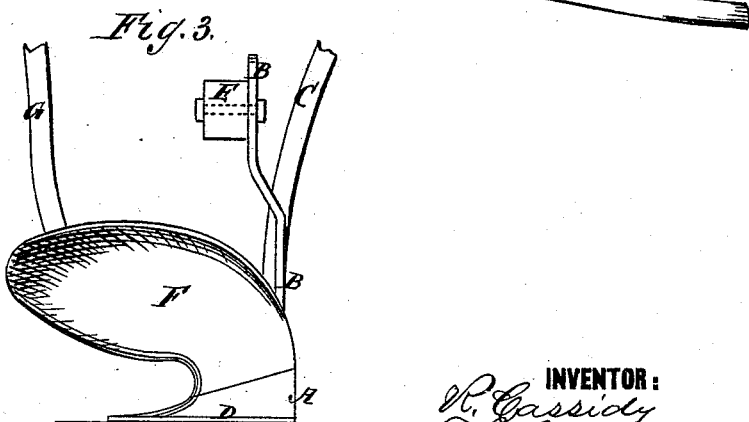

Be it known that we, ROBERT CASSIDY, THOMAS B. LAMB, and CHAUNCEY L. VAUGHAN, of Beloit, in the county of Mitchell and State of Kansas, have invented a new and useful Improvement in Plows, of which the following is a specification:

Figure 1 is a side view of our improved plow. Fig. 2 is a top view of the same. Fig. 3 is a front view of the same.

Similar letters of reference indicate corresponding parts.

The object of this invention is to furnish an improved plow, which shall be without side draft, and of lighter draft than ordinary plows, and may be readily adjusted to run deeper or shallower in the ground, and to take more or less land, as may be desired.

The invention will first be described in connection with the drawing, and then pointed out in the claim.

A is the land-side, to which is bolted the lower end of the standard B, and of the land-side handle C. To the forward end of the land-side A is attached, or upon it is formed, the shear D, which is made with its forward or cutting edge at right angles with the beam E, as shown in Fig. 2. F is the mold-board, the forward part of which is attached to the land-side A, the shear D, and the standard B, and its rear part is attached to the mold-board handle G, in the usual way. The upper part of the standard B is bent twice at an obtuse angle, or is made with an offset toward the mold-board, as shown in Fig. 3, and its upper end is forked, and is slotted to receive the bolts by which it is secured to the beam E, to enable the pitch of the plow to be adjusted as required. H is a screw-rod, which passes through the rear end of the plow-beam E, and its ends are secured to the handles C G. The beam E is secured in place upon the screw-rod H by two nuts placed upon its opposite sides, so that by adjusting the said nuts the rear end of the beam E may be adjusted to cause the plow to take or leave land, as may be desired.

This construction brings the plow-beam directly over the line of resistance, so that there will be no side draft, as there must be when the beam is placed over the land-side.

The handles C G are connected by rounds, in the usual way. The connection between the beam E and the handles C G is strengthened by the brace-rod I, the forward end of which is bolted to the side of the beam E. The rod I is bent at an acute angle, passes through the mold-board handle G, and its end is secured to the land-side handle C.

Having thus described our invention, we claim as new and desire to secure by Letters Patent—

The plowshare D, of the form shown, and having the cutting-edge at right angles with land-side, in combination with the slotted standard B, curved inward to bring the plow-beam nearly over the center of share, as and for the purpose specified.

R. CASSIDY.
THOMAS B. LAMB.
CHAUNCEY L. VAUGHAN.

Witnesses:
WALTER SCOTT,
L. C. GROMMON.